Aug. 25, 1964  F. G. ROSMAN  3,145,395
INFANT CAR BED
Filed Feb. 20, 1962  2 Sheets-Sheet 1
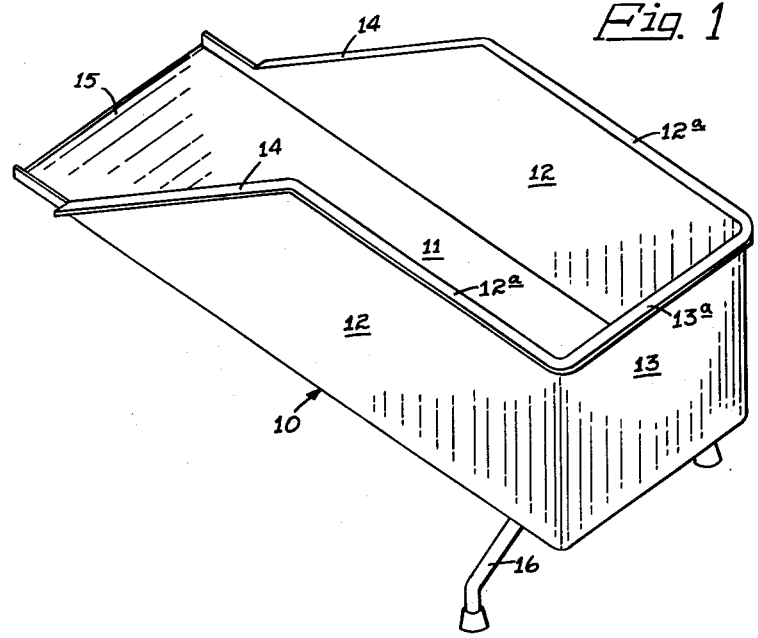
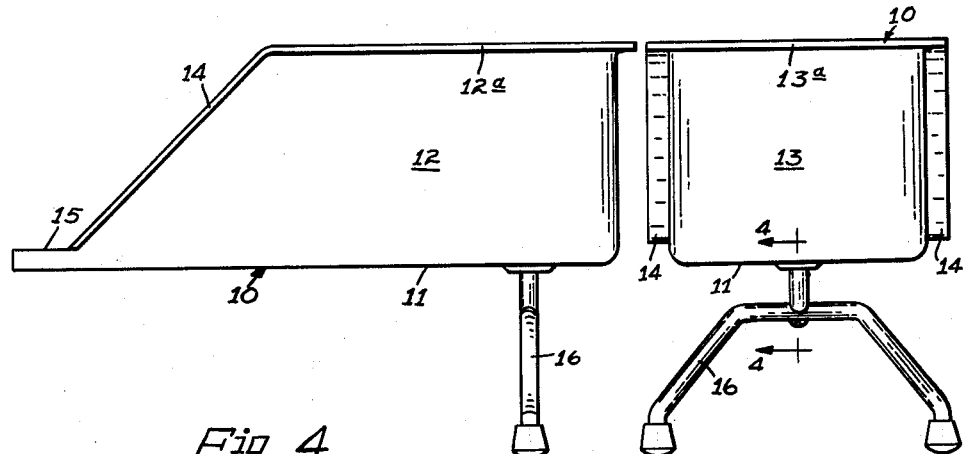
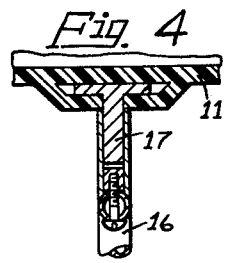
INVENTOR.
FRANK G ROSMAN
BY Wells & St. John
ATTYS.

Aug. 25, 1964　　　F. G. ROSMAN　　　3,145,395
INFANT CAR BED

Filed Feb. 20, 1962　　　　　　　　　2 Sheets-Sheet 2

INVENTOR.
FRANK G. ROSMAN
BY
ATTYS.

3,145,395
INFANT CAR BED
Frank G. Rosman, Creston, Wash.
Filed Feb. 20, 1962, Ser. No. 174,538
2 Claims. (Cl. 5—94)

This invention relates to a novel infant car bed.

In our highly mobile society it has become the practice for parents to utilize various forms of car beds when traveling with infants in an automobile. The many forms available on the market today normally are usable only in the back seat of a car and generally rely upon brackets which fit over the back rest of the front seat for their main support. Such beds utilize room in the automobile which often could be better utilized for passengers. The space consumed is often a considerable fraction of the total space available in the back seat area.

It is a first object of this invention to provide a car bed which may be utilized in the center of a front seat of any automobile. This space is normally not used by the persons in the vehicle and therefore the infant car bed provides no inconvenience to other passengers. The car bed is designed so as to be completely free of interference with the driver's responsibilities in operating the vehicle. This positioning of the car bed also allows ready surveillance of the infant's condition by the driver during operation of the vehicle.

Another object of this invention is to provide such a car bed which may be utilized in two-door models wherein the back rests of the front seat are pivotal so as to allow for entry into the rear seat area. The present invention presents no obstructions to normal use of such a vehicle.

Another object of this invention is to provide a car bed having a rigid body which is simple in construction, and which can be readily removed from the vehicle when desired. No attachment to the vehicle itself is necessary in order to properly use this device.

These and further objects will be evident from a study of the attached drawings and from the following description which pertains to a preferred form of the invention. It is to be understood that this form is illustrative only and is not intended to limit or restrict the scope of my invention as it is defined in the claims which follow.

In the drawings:

FIGURE 1 is a perspective view of a car bed constructed according to the concepts of this invention;

FIGURE 2 is a side view of the car bed illustrated in FIGURE 1;

FIGURE 3 is a front end view of the car bed shown in FIGURES 1 and 2;

FIGURE 4 is an enlarged sectional view taken through the line 4—4 in FIGURE 2;

Figure 5:
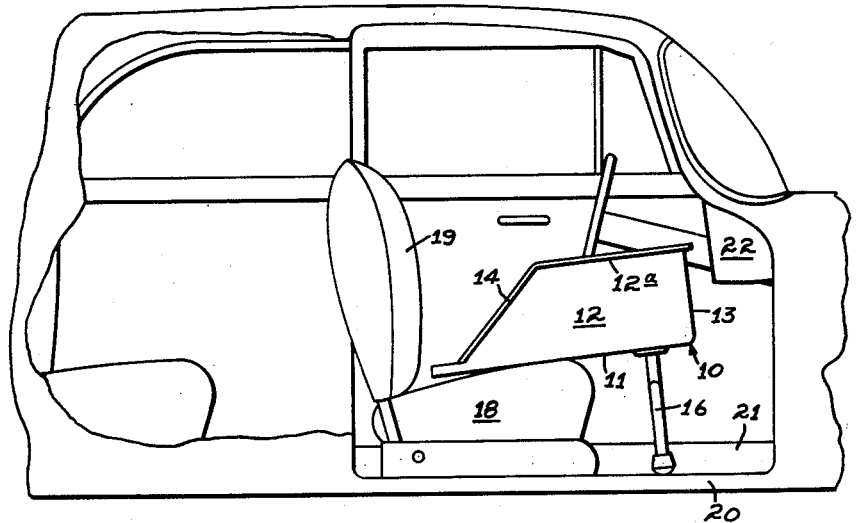
FIGURE 5 is a side view of the car bed as it is used in a vehicle, the view being taken from the left side of vehicle with the left side walls removed.

This invention concerns itself with a car bed for infant's use in an automobile. It is designed primarily for use in the front seat section of the vehicle, although it is equally well adapted for use in the rear seat section. The car bed is very simple in construction and may be fabricated of fiber glass, plastic or any other suitable material having the necessary rigidity and useful life.

The car bed comprises a simple box-like body 10 which is open at its rear end and across its top. The body 10 includes a plain bottom section 11, plus integral sides 12 and a front section 13 which extend upwardly from the bottom section 11. The sides 12 and front section 13 terminate in smooth turned lips 12a and 13a respectively, which provide a safe edge along the top of the body 10. The rear ends of the sides 12 are formed with tapered top edges 14 which extend upwardly and forwardly from the bottom section 11. The bottom section 11 protrudes slightly beyond the ends of the sides 12 to form a small ledge 15. Inclusion of the ledge 15 is not necessary to the practice of this invention but provides a slight extension when necessary.

The body 10 is adapted to be mounted on a seat cushion with the bottom section 11 resting on the top surface thereof. Since the front end of the body 10 should protrude beyond the edge of the esat cushion, it is necessary to provide further supporting means adjacent this area. This is provided by means of a bifurcated leg structure 16 which is formed in an inverted Y-shaped. This inverted Y-shape configuration provides a pair of spaced legs which may straddle a raised area in the vehicle floor. The upper end of the leg structure 16 is preferably mounted on a stub shaft 17 fixed to the bottom surface of section 11 adjacent the front end thereof. This structure can best be seen in FIGURES 2 and 4.

Figure 6:
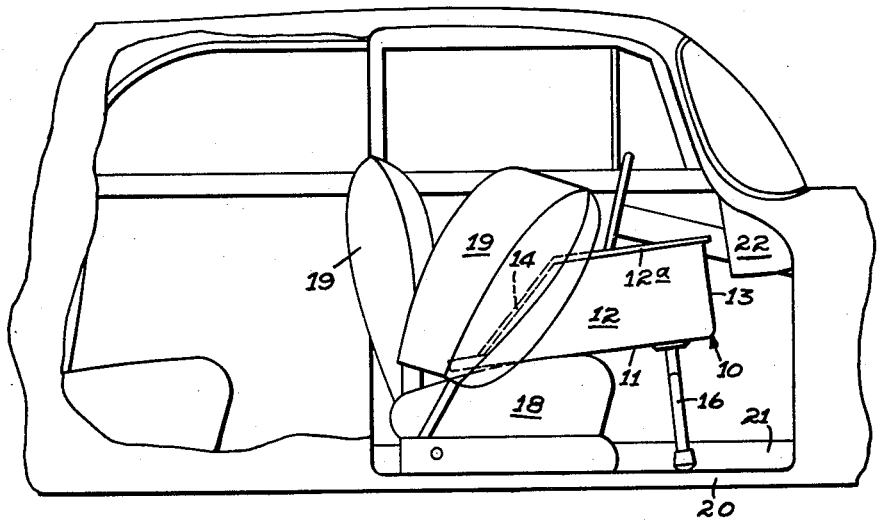
FIGURE 6 is a view similar to FIGURE 5, showing the unrestricted use of the back front seat back cushion for entry purposes.

In FIGURES 5 and 6 the normal use of this invention may be seen. A typical vehicle is shown with the pertinent parts thereof illustrated generally. The front seat includes a seat cushion 18 and a seat back rest 19. In the case of a two-door sedan the back rest 19 will be split along its length so as to allow the two portions of the back rest 19 to be pivoted forwardly and independently of one another to facilitate entry of persons to the rear seat area. The vehicle also includes a floor 20, having a raised central area 21 which normally provides clearance for the vehicle transmission and drive shaft. Also shown is a typical dashboard 22 which projects rearwardly from the vehicle fire wall.

As may be seen in FIGURES 5 and 6, the infant car bed is positioned on the seat cushion 18 and fits back to the corner of the seat back 19. The front end of the body 10 extends to a position adjacent the dashboard 22. The leg structure 16 straddles the raised area 21 of the floor 20 and supports the forward section of the body 10. In this position the car bed will normally be extremely secure, due to the large supporting area offered by the cushion 18 and by the close proximity of the dashboard 22 which will prevent forward motion of the body 10. An infant will normally be placed in this car bed with its head adjacent the forward end of the body 10. Should one desire to enter the rear seat area, he may tilt the seat back 19 forwardly as illustrated in FIGURE 6. Such motion will be unhampered by the car bed due to the position of the tapered section 14. This clearance allows one to use the vehicle in its normal fashion.

The present invention is usable in any vehicle, either a two-door or a four-door model. It is usable despite the provision of raised sections along the back 19 of the front seat, and despite the relative width of the split sections of the seat back 19. It also is usable in vehicles having bucket seats, since the width of the body 10 is sufficient to straddle the space separating these seats. The car bed may further be used in a home when resting on a chair or sofa with the leg structure 16 supporting the bed from a floor. The installation of the bed is extremely simple and facilitated by the easy removal of the leg structure 16 from the shaft 17.

Thus I have described an infant car bed which is extremely simple to manufacture and use. It is obvious that many changes could be made in this structure without deviating from the basic concepts of my invention. Therefore only the following claims are intended to limit and define the extent of the invention.

Having thus described my invention, I claim:

1. An infant bed for use on the seat of an automobile, comprising:
   a rigid unitary body having a plain bottom section adapted to rest on a seat cushion and integral side and front walls extending upwardly therefrom, the rear edges of said side wall being angularly directed upwardly and forwardly from a location slightly forward of the rear edge of said bottom section so as to allow ample clearance for motion of a pivoted seat back rest;
   a single supporting leg structure mounted on the underside of said bottom section at the front end thereof and extending downwardly therefrom, said leg structure being divided in an inverted Y-shaped configuration adapted to straddle raised areas in the floor of an automobile.

2. An infant bed as defined in claim 1 wherein said leg structure comprises:
   a downwardly protruding stub fixed to the bottom surface of said bottom section at the front center thereof;
   and a separable tubular leg adapted to receive said stub and including laterally-spaced lower portions for support on a floor.

References Cited in the file of this patent

UNITED STATES PATENTS

| | | |
|---|---|---|
| 1,618,493 | Thiele | Feb. 22, 1927 |
| 2,653,330 | Nolan | Sept. 29, 1953 |
| 2,676,336 | Gilmer | Apr. 27, 1954 |
| 2,834,031 | Johansen | May 13, 1958 |

FOREIGN PATENTS

| | | |
|---|---|---|
| 37,336 | Netherlands | Jan. 15, 1936 |
| 332,373 | Switzerland | Oct. 15, 1958 |